United States Patent [19]

Felter et al.

[11] Patent Number: 5,066,422

[45] Date of Patent: * Nov. 19, 1991

[54] STATIC DISSIPATIVE VINYL SURFACE COVERING MATERIALS, METHODS FOR THEM, AND COMPOSITION FOR STATIC DISSIPATION

[75] Inventors: Richard E. Felter, Lancaster; Dean A. Markley, Mountville; Deborah L. Musser, Lancaster, all of Pa.

[73] Assignee: Armstrong World Industries, Inc., Lancaster, Pa.

[*] Notice: The portion of the term of this patent subsequent to Dec. 11, 2007 has been disclaimed.

[21] Appl. No.: 535,054

[22] Filed: Jun. 8, 1990

Related U.S. Application Data

[63] Continuation-in-part of Ser. No. 201,854, Jun. 3, 1988, now Defensive Publication No. 4,976,890.

[51] Int. Cl.$^5$ ............................ H04B 1/06; B05D 3/02
[52] U.S. Cl. ................................. 252/511; 252/506; 252/507; 252/518; 252/520; 427/191; 427/195
[58] Field of Search ................ 252/511, 512, 518, 520, 252/506, 507; 524/439, 495, 496, 401, 409; 427/191, 195, 375, 376.2, 385.5

[56] References Cited

U.S. PATENT DOCUMENTS 4,228,650 10/1980 Martin et al. ........................ 252/511
4,374,760 2/1983 Charles ............................... 252/511

Primary Examiner—Josephine Barr

[57] ABSTRACT

Particulate vinyl resin mixed with a liquid premix of carbon black, plasticizer, etc. provides surface resistivities of $10^4$–$10^9$ ohm/sq. with as little as 0.2 to 5% by weight carbon black in fused sheets or films useful for conductive flooring or wrapping. Overcoating with a plastisol before fusion provides a smooth surface without loss of static dissipative properties. Conductive $TiO_2$, $Sb/SnO_2$, organic titanates, dispersions of carbon black and titanium dioxide, di-2-ethylhexyl phthalate, epoxidized soybean oil, polyethylene glycol and organic stabilizer are useful for preparing PVC resin compositions.

20 Claims, No Drawings

STATIC DISSIPATIVE VINYL SURFACE COVERING MATERIALS, METHODS FOR THEM, AND COMPOSITION FOR STATIC DISSIPATION

CROSS-REFERENCE TO RELATED APPLICATION

This application is a continuation-in-part of U.S. Ser. No. 201,854, filed June 3, 1988, now U.S. Pat. No. 4,976,890 entitled "Static Dissipative Vinyl Sheet and Film".

FIELD OF THE INVENTION

The invention relates to electrically conductive plastic sheets, foams, or films. Particularly, the invention relates to vinyl plastic structures in the form of sheets, foams, or films which contain conductive particles and which, optionally, can be overcoated with a vinyl plastisol composition. Also described are the dispersions of the electrically conductive particles. The dispersions are used to make the conductive sheets.

BACKGROUND OF THE INVENTION

Carbon black and other metals, powders, fibers, ionic polymers, and other additives have been incorporated in a wide variety of manufacturing formulations for antistatic protection. Carbon black which is readily available in many grades either as a powder or aqueous dispersion can be conveniently employed whenever black coloration is not objectionable as in tires, mats, video disks, etc.

Dispersions of powders in liquids can be obtained commercially. The dispersions of powders such as carbon black in plasticizer are custom made commercially.

Pony et al., U.S. Pat. No. 4,097,656, discloses polymerizable plastics which can be blended with conductive carbon black specially prepared by treatment with hydrocarbons under pressure and then heated.

Martin et al., U.S. Pat. No. 4,228,050, discloses molding video disks containing about 15% carbon black having a high surface area and a high proportion of voids in which electrical current flows in a highly efficient manner in an otherwise nonconductive polymer matrix.

Charles, U.S. Pat. No. 4,374,760, discloses improving conductivity of a resin with carbon black by adding an organic titanate coupling agent to the composition.

McCraken et al., U.S. Pat. No. 4,629,585, discloses a foamable antistatic polymer composition containing 5% conductive carbon black having a BET surface area of at least 500m$^2$/g.

A recent article by Arie Calahorra—*Investigation of Electrical Resistivity—Pigment Volume Concentration Relationship in Carbon Black-Filled Conductive Paint*, Journal of Coatings Technology, Volume 60, No. 757, February 1988, discusses conductivity changes in a carbon black/PVC polymer matrix with carbon black loadings of 15 to 37%. A high grade conductive carbon black (Ketjenblack EL-DJ600 from AKZ0 Chemie, the Netherlands) was reported to be the best conductive filler employed in these tests.

White and transparent conductive powders for use as antistatic additions in PVC and polypropylene are described in an article by Yoshizume and Wakabayashi of Mitsubishi Metal Corporation, *Conductive Powders Adapt to Today's Product Decors*, Plastics Engineering, March 1987, pp. 61-64. Based on data provided in this article, about 57% by weight titanium dioxide coated with antimoney doped tin oxide will provide 10$^9$ ohm/sq. surface resistivity for a plastic film.

Thus, while a large number of publications existed prior to the present invention on various ways to employ conductive particles such as carbon black in vinyl plastics such as PVC, the prior publications failed to describe means or measures to easily utilize carbon black without rendering the composition black or how to employ low amounts of carbon black, e.g., using less than 4 to 5% by weight of carbon black in a vinyl plastic matrix.

In contrast to the practice and experience heretofore, the present invention utilizes considerably lower amounts of carbon black and enables dilution of the carbon black pigment with nonconductive white pigment while providing fully adequate static dissipative vinyl sheets and films.

SUMMARY OF THE INVENTION

The present invention provides a novel static dissipative composition. The composition includes a polyvinyl chloride porous resin, a plasticizer, a stabilizer and the conductive particles which suitably are present in an amount of from 0.2 to 20% by weight of the total weight of the composition. The fused composition provides a surface resistivity below 10$^{10}$ ohm/sq. Without further additions or processing, a sheet or film of the composition provides utility for an antistatic mat which can be either unfoamed or foamed.

The instant invention also includes the use of ingredients such as coupling agents, processing aids, pigments and whiteners which can be added to the dryblend. Some preferred embodiments will include a plastisol overcoat, like the white printing ink plastisol overcoats. Conventional overcoating technology can even be relied on for ingredients and amounts. Usually the overcoat plastisol desired will have a polymer or copolymer of polyvinyl chloride with a plasticizer, and it may also include ingredients selected from the group consisting of a stabilizer, a pigment, a processing aid, a foaming agent, a modifier, and a hardener.

If the overcoat is used, a layer of the conductive dryblended composition is sintered and then the plastisol overcoating is applied and the combination is fused.

A preferred composition comprises: (a) polyvinyl chloride porous resin, (t') di-2-ethylhexyl phthalate and butyl benzyl phthalate', (c) organotin stabilizer, (d) an amount of from 0.3 to 4.5% by weight of conductive carbon black, (e) isopropyl triisostearyl titanate (as a coupling agent), (f) titanium dioxide and (g) polyethylene glycol and epoxidized soybean oil. Dryblends of this combination can be fused or sintered, overcoated and then fused to obtain conductive surface covering sheet materials.

A preferred overcoating is a printing ink plastisol comprising a vinyl resin; isobutyrate, as a plasticizer; a di-2-ethylhexyl phthalate plasticizer; an epoxidized soybean oil as a stabilizer/plasticizer; an organotin stabilizer; and a pigment. Overcoating is followed by fusing at an effective temperature, preferably fusing is at about 425° F. for three minutes. The vinyl resin which, in general will be preferred, will be a polymer or copolymer of vinyl chloride.

The instant fused compositions have a smoothed surface and can be produced in shades of grey, with a salt and pepper appearance or with colors and designs made by the overcoating. Black could even be avoided by using light-colored conductive materials.

A method for producing static dissipative vinyl sheet or film comprises the steps:

(1) mixing a porous polyvinyl chloride dryblend resin and a liquid premix comprising conductive particles, plasticizer and stabilizer to form a dryblend;

(2) forming a layer of the dryblend on a substrate; and (3) heating the dryblend to fuse it, thereby producing a static dissipative vinyl sheet layer or film.

The substrate can be either a permanent carrier such as a vinyl sheet or a felt backing material, or it can be a temporary substrate on which the layer of conductive dryblend particles is formed. The temporary substrate can be a substrate which will hold the conductive dryblend resin layer until the conductive sheet or film is produced, or it can be a carrier substrate that is later separated. Some temporary substrates are removed when the conductive material is fused. Preferred embodiments of this invention call for the use of a smear coating. This thin coating is a temporary substrate which holds the conductive particles and stablizes them in place long enough for them to be fused or sintered, overcoated and fused. Preferably the smear coating is a PVC plastisol.

In other preferred embodiments, flooring materials will be prepared that have conductive or grounded permanent sheet backing material.

Preferred methods for producing static dissipative vinyl composition use a liquid pre-mix comprising the conductive particles dispersed in the liquid ingredients for the dryblend. The liquid ingredients include at least one plasticizer. At least one stabilizer and/or at least one processing aid can also be included. Preferably, the dispersion of particles will be made using all of the liquid ingredients to be used for the dryblend. If desired, one could also disperse particles of a pigment or whitener (such as titanium dioxide) along with the conductive particles. Preferred conductive particles are conductive carbon black and antimony doped tin oxide-coated $TiO_2$. Preferred embodiments of the instant pre-mix dispersion will include the following liquid components: di-2-ethyl hexyl phthalate, butyl benzyl phthalate, epoxidized soybean oil, polyethylene glycol and organotin stabilizer.

The instant dryblend compositions include mixtures of porous PVC resin having (1) a conductive matrix of conductive particles which are dispersed throughout the pores, in crevices, and on the resin surface; and (2) the liquid ingredients (plasticizers, stabilizers, etc.) that have been (a) absorbed, (b) adsorbed, or (c) absorbed and adsorbed by the resin.

The dry-blend is a free flowing porous PVC resin. The liquid ingredients (the plasticizer, the stabilizer, and any optional liquid ingredients) are absorbed and/or adsorbed into the resin itself and/or the liquid fills the pores, cracks and crevices of the resin particle. Both adsorption and absorption of the liquid can take place to produce the conductive dryblend, although with heat and/or time, the liquid will become absorbed. (The term "absorption" as used herein is taken from *Hawley's Condensed Chemical Dictionary*, 11th Edition, and refers to the penetration of one substance into the inner structure of another, as distinguished from adsorption, in which one substance is attracted to and held on the surface of another.)

Adsorption of the liquid takes place during cold blending. When heat (usually heat caused by high shear mixing) is present, more of the liquid ingredients will be absorbed by the dry blend and a more preferred conductive matrix will result.

At least some absorption preferably should occur. If no absorption takes place, and the liquid is only adsorbed, then the liquid would rest in the gaps, pores, cracks, and crevices, and would even rest on the resin surface. In this case, the conductive particles would not be carried most effectively into the pores and crevices. With absorption the particles are carried into the pores and crevices more effectively which forms a better conductive matrix. In addition to this without any absorption, the mixture would be more wet from the liquid and could even be somewhat sticky.

To obtain the conductive dryblend having a matrix of conductive particles fixed on the surface, in the pores and crevices, the particles are dispersed in the resin. Mixing is important, and is done to disperse the conductive particles in an amount effective to obtain the conductive matrix in the resin.

In another preferred embodiment, the above method includes applying a plastisol comprising vinyl resin, isobutyrate, di-2-ethylhexyl phthalate, epoxidized soybean oil, organotin stabilizer and titanium dioxide to a sintered layer of a dryblend made with the above premixed dispersion followed by fusing.

DETAILED DESCRIPTION OF THE INVENTION

A need exists for flooring, table tops, surfaces, containers, etc. which are suitable for use in an environment where electrostatic discharge must be controlled. Where sensitive electronic components are manufactured, designed, assembled, packaged, tested and used, stray electrostatic charge must be dissipated effectively to avoid damage or inconsistent results. It is convenient when the materials manufactured for these purposes are constituted of a conductive composition. Further, it is advantageous if these antistatic materials can be manufactured in other than basic black color tones. It is also desirable to have material that has a substantially uniform electrical performance at different humidity levels.

Conductive carbon blacks and other particles suitable for use in the present invention are commercially available as powder or could be custom made in dispersion forms. These include: grades of Ketjenblack ® from Noury Chemicals of Akzo Chemical America, grades of Conductex ® from Columbian Chemicals Company, and Vulcan XC-72 ® from Cabot Corporation. White and transparent conductive particles are available from Mitsubishi Metal Corp., Saitama, Japan or its U.S. supplier, C. Withington Co. These conductive particles, for example, are $TiO_2$ coated with antimony doped tin oxide ($Sb-SnO_2/TiO_2$). Other available particles are the antimony doped tin oxide mixture ($Sb/SnO_2$). Metals in powder form can be used. Mixtures of different types of conductive particles can be prepared and used.

While it was previously known to use these carbon blacks and even to specially treat them, it has now been discovered that by practicing the present invention, it is possible to use extremely low loadings of carbon black and still achieve antistatic protection. Similar reductions in loadings are also possible with other conductive particles.

The present invention can be used in systems having plasticized vinyl polymer of which plasticized polyvinyl chloride (PVC) is a preferred component. However, the invention is not limited since other thermoplastic polymer systems such as described in U.S. Pat. Nos. 4,097,656; 4,228,050; 4,374,760; and 4,629,585 can employ the practice of the present invention. Porous resins, however, must be used with the conductive particles to set up the conductive matrix.

PVC resins suitable for the present invention are commercially available from many commercial sources. The preferred porous resins recommended for rapid absorption are available from Escambia Chemical Corporation and Air Products Plastics Division as PVC pearls.

The practice of the invention includes surface treatment of porous polymer particles with much smaller conductive particles so that the polymer particles have conductive shells which produces a conductive matrix. The smaller conductive particles are easily lodged in the crevices and pores of the resin particle. The conductive particles can provide a volume penetration up to 20% of the pore volume of the resin ranging from about 1 to about 20%. Preferably, however, the volume penetration will be lower, so that the conductive particles form the conductive shells outside of the particles' core. Preferred volume penetrations can be obtained up to about 10%. Preferably, then the particles penetrate from about 1 to about 10% of the pore volume of the resin particles. Even more preferred volume penetrations will be less than about 5%; more preferably, therefore, the conductive particles will take up from about 1 to about 5% of the resin's pore volume. This can be especially preferred when the amount of conductive particle is used in an amount of less than about 5% by weight. In such a case, the conductive particles would lodge in the outer portions of the resin particles, forming a conductive shell at the extreme outer portions of the resin particles in the dryblend. When these particles rest together, they form a conductive matrix or chain; thus the carbon is used more efficiently.

When the conductive dryblend is spread out in a layer, the conductive pattern formed by the particles in the layer gives better conductivity in the fused or the sintered, coated and fused products even though the conductive particle concentration is reduced.

It is preferred to use conductive particles having an average size in the range of from about 0.05 to about 0.001 microns. Acceptably, the average size of the conductive particle can be in the range of from about 0.5 to about 0.001. Of the preferred types of conductive particles, the carbon black and the $Sb/SnO_2$ can be commercially obtained having average sizes in the preferred range. The $Sb—SnO_2/TiO_2$ tends to have larger particles, in the acceptable range (0.5–0.001).

It was indeed a surprising result to discover that this conductive matrix required considerably less carbon black than employed heretofore and that electrical conductivity was not significantly decreased as various compositions were fused, or sintered and fused, and even optionally overcoated with a non-conducting layer.

It was equally surprising to find that dilution with non-conductive polymer particles did not significantly diminish conductivity while the appearance of the composition was esthetically improved. If desired, pigmented particles of other colors can be added instead of, or in addition to, white.

According to the present invention, surface materials have been produced with $10^1$ to $10^9$ ohm/sq. surface resistivities. Materials having reduced surface resistivities can be produced by this novel process even having from about 0.2 up to about 4.5% by weight of conductive particles in the composition. Because much less conductive carbon black is required, the mechanical properties of the surface materials are not significantly sacrificed. A suitable carbon black concentration range in the resin is from about 0.2 to about 10% by wt. of the total dry blended composition.

To make the dry blend, suitably the plasticizer is used at an amount in the range of from about 25 to about 75% by weight of the resin. The stabilizer is used at an amount in the range of from about 0.5 to about 3.5% by wt., suitably modifiers can be used at amounts in the range of from about 1 to about 10% by wt.

Not only did the use of a titanate coupling agent lower the amount of carbon black required, but the addition of carbon black to the polymer was a smoother and cleaner process.

It was further found that the process proceeds more efficiently when conductive particles are predispersed or pre-mixed in the plasticizer instead of adding the powders by themselves. This is a significant manufacturing advantage.

The liquid pre-mix formed with the conductive particles and the liquid dryblend ingredients is a dispersion of the conductive particles. Advantageously, the liquid is a vehicle that carries the conductive particle into the resin. Using this particle dispersion also uniformly separates the conductive particles allowing them to be more effectively and efficiently blended (mixed) into the resin to obtain a uniform dryblend. The particles are more effectively dispersed, forming an excellent conductive matrix. For the best results and the preferred process, therefore, the dispersion should be substantially uniform.

The more preferred dispersions will be characterized by a good shelf life and by properties that make the dispersion easily handled and used. Preferred dispersions can be prepared having a shelf life in excess of one month and even up to several months. The instant dispersions of the conductive particles in the liquid ingredients can be measured with the wedge gauge, commonly known as the Hegman Gauge, which is frequently used in the paint industries. Further information on this gauge and its use can be found in *Dispersion of Powders in Liquids* by G. D. Parfitt (Elsevier Publishing Co. Ltd., 1969) under "Control Tests for Degree of Dispersion", pgs. 178-180. The gauge scale commonly ranges from 0 to 8 and sometimes from 0 to 10. In the present invention, the dispersions used can have a Hegman gauge reading of from about 4 to about 6, and preferably the gauge reading is at least 5. These dispersions have excellent shelf lives and good viscosities.

It has been found that preferred dispersions can be prepared using the following liquid ingredients (1) di-2-ethylhexyl phthalate and butyl benzyl phthalate (plasticizers) and (2) epoxidized soybean oil (resin stabilizer/plasticizer). Preferred dispersions permissively may also have the minor, but frequently used liquid ingredients such as a stabilizer (organo tin stabilizer is preferred) or a processing aid (polyethylene glycol is preferred). The ingredients preferably are combined to obtain a dispersion that can be measured out in quantities that contain each individual ingredient in the total amount desired for the resin being processed. Alternatively, supplemental amounts of the ingredients, or additionally, desired ingredients can be added before, during, or after mixing the dispersion and the resin.

Suitably, the liquid dispersion will be from about 3 to about 10% by weight of the conductive particles. When using carbon black, the dispersions preferably will include from about 4 to about 8% by wt. of a carbon black. Although any PVC plasticizer can be used in a preferred embodiment, the plasticizer is selected from the group consisting of a phthalate plasticizer, polyethylene glycol, and epoxidized soybean oil. Most preferably the plasticizer is di-2-ethylhexyl phthalate, and/or butyl benzyl phthalate. The polyethylene glycol and epoxidized soybean oil also act as modifiers. Although any stabilizer can be used for the PVC, preferably it is an organo tin stabilizer.

In the dispersion the plasticizer:stabilizer concentration ratio (by wt.) is in the range of from about 7.5:1 to about 35:1.

Previous requirements to incorporate 5% or more carbon black in a composition to insure adequate conductivity meant that viscosity control was a constant problem unlike the invention. In contrast to prior art workers who found it necessary to use only the most expensive grades of carbon black in order to minimize property loss, the reduced amounts of carbon black required per the present invention allow cheaper grades of carbon black to be used while avoiding changes in mechanical properties. These and other advantages will become apparent by following the practices of the present invention.

In general, the process of the invention combines a particulate polymer with conductive carbon black particles in an efficient manner to produce static dissipative sheets and films. As little as one twentieth the conventional amount of carbon black is required when a liquid premix containing the carbon black is carefully added to the particulate porous resin while mixing with sufficient shear to heat the mixture a limited amount.

It is preferred that all liquid components be combined in a liquid premix and combined with a porous PVC resin in at least two portions while avoiding a temperature rise above about 160° F. When these precautions are taken to add liquid to solid and control mixing and temperature; a dry blend is produced in which the polymer particles are coated with the finely divided carbon so that the surface of the particle becomes conductive. According to the process of the present invention, it is possible to even add a non-conductive pigmented dry blend in an amount up to 60% by wt. of the total amount of resin, along with the carbon black dry blend and maintain conductivity while producing relatively attractive material with shades of grey or salt-and-pepper effects.

Two possible modifications are:
1. Add TiO$_2$ with the carbon black to produce grey dry blend and grey sheet goods.
2. Mix carbon dry blend with TiO$_2$ dry blend to produce salt-and-pepper effect. Both can be accomplished while maintaining good electrical properties.

A particular advantage of the invention is the ability to use readily available materials and equipment without further treatment or modifications. The present invention is simpler than some of the methods and processes of the prior art which require special reagents and equipment to obtain good conductivity with carbon black, i.e., U.S. Pat. No. 4,097,656. All materials and equipment satisfactory for the practice of the present invention can be readily obtained or would be normally available in a sheet or film manufacturing facility.

From a processing viewpoint, the use of lower amounts of carbon black in the resin avoids viscosity problems such as does occur when more carbon black is required. Even though viscosity reducers such as titanates are known, the present invention eliminates this need, if so desired.

The conductive dryblend resin is formed by mixing the porous PVC resin with the liquid ingredients and the conductive particles (either separately or in a dispersion). Although conventional dryblending is preferred, the conductive matrix can also be formed by blending without heat. These techniques, herein called "cold blending" are sometimes referred to as "preblending". This can be noted in references such as "Dryblending Behavior of Commercial PVC", by L. T. Carlton and E. Mishuck (Journal of Applied Polymer Science, Vol. 8, pgs. 1221-1255; 1964). This reference also discusses dryblending (blending with heat) and also calls it hot blending. Both of these techniques could permissively be used to form the instant compositions.

In cold blending, the heat which is needed to cause the absorption of the liquid into the resin particle is not used or formed. The liquid ingredients will fill pores and will not be totally absorbed into the resin unless it is permitted to sit for a longer period of time. Cold blending will still tend to cause a filtration of the liquid away from the particles since the liquid can spread over particle surfaces and fill the tinier pores and crevices of the resin particles.

When using cold blending for better conductivity, the conductive particles should be distributed substantially uniformly over the available surface area of the resin. The resin surface area referred to here naturally includes the surface available from the pores, cracks and crevice areas. In cold blending, since liquid fills these areas, it is a little more difficult to obtain this uniform distribution. Thus, it is preferred to use enough heat to cause absorption of liquid into the resin particle itself. Actual dryblending ("hot" dryblending) that allows a substantially complete absorption of the liquid is preferred to cold blending. Preferably, therefore, the conductive dryblend is prepared by mixing at a temperature in the range of from about 140° F. to about 160° F.

The process of the present invention can be envisioned as filtration of conductive particles out of a liquid by a porous resin "filter". The resin particles or "filter" remove solid particles from the liquid as the liquid penetrates further into the pores and/or into the resin particle itself to produce the "dry" blend which has a thin black conductive shell around each particle. When the particles are layered and sintered, the surfaces become fused, and a conductive chain structure is produced where current flows along the outer surfaces of the connecting conductive particles. In a fusion process, the thickness of a dry blend lay-up can condense about one third. But, surprisingly, the conductance improves even more for the fused material, thus reducing even further the amount of carbon black required.

The present invention provides sheets and films giving antistatic protection for static-free work environments and for consumer goods.

The process of the invention also allows production of a black conductive film for packaging which contains from about 3.5 to about 1% by weight carbon black or as thin conducting layers in composites.

In the following examples, surface resistivity measurements were conducted according to ASTM D-257 using an Electrotech Systems Inc. Resistivity Probe—

Model 802—"IKE PROBE". An 11-lb. weight applied compressive force to the probe for all measurements. A Dr. Theidig Milli-To wide range resistance meter was connected to the probe for direct digital readout of resistance. The tests conducted at 50% RH were set up in a room controlled at 50±1% RH and 23±1° C. temperature. The tests conducted at 15% RH were set up in a dry box controlled at 14±2% RH and 23±1° C. temperature.

The following examples are offered to illustrate the instant invention and should not be taken to limit it.

EXAMPLE 1

The following ingredients were used in the indicated proportions to prepare about 50 "black" dry blends.

| No. | Material | Parts by Weight |
|---|---|---|
| 1 | PVC Resin (Porous Grade) | 100 |
| 2 | DOP (Di-2-ethylhexyl phthalate) | (30–60) |
| 3 | Butylbenzyl phthalate S-148 | 10 |
| 4 | ESO (Epoxidized Soybean Oil) | 5 |
| 5 | Polyethylene Glycol PE 200 | 1 |
| 6 | Organotin Stabilizer M-275 | 2 |
| 7 | Titanium Dioxide Pigment | 2 |
| 8 | Isopropyl Triisostearoyl Titanate KR55 | (0.10–0.16) |
| 9 | Carbon Black Powder | (.6–4.8) |

The carbon powder (9) Conductex ®—975 from Columbian Chemicals was supplied in large agglomerated form to minimize dusting. To begin forming the dry blend, the solids (1, 7) were first charged to a Henschel mixer. The liquids (2, 3, 4, 5, 6, 8) were combined with the carbon black (9) to prepare a liquid premix. Starting at low speed, one half of the liquid premix was slowly added to the solids in the mixer. The mixer was then turned to high speed until the temperature reached 130° F. (or until the dry blend looked "dry"). The speed dial was then turned back to low and the rest of the liquid premix was slowly added. The speed dial was then turned to high again. When the temperature reached 150°–160° F., the operation was stopped. The hot-dry blend was collected and allowed to cool, as a black particulate composition.

Each dry blend was passed through a 30 mesh standard sieve screen to remove any large pieces. Then using a piece of 8"×12" Warren release paper, a thin (0.001"–0.002") vinyl plastisol smear coat was applied to the surface using a No. 30 wire wound rod. The sieved dry blend was applied uniformly thick over the smear coat using a 0.110" draw-down bar. The dry blend was then sintered in a hot-air oven at 350° F. for three minutes. Under these conditions, a well-sintered dry blend formed a well knit porous structure from which material did not flake off easily. At higher carbon loadings, it was necessary to add more plasticizer to the dry blend mix to prevent the sintered dry blend from flaking easily.

A white printing ink with the formulation shown below was applied over the surface of the dry blend to fill in the porosity.

| Ingredient | Parts |
|---|---|
| PVC Resin | 100 |
| Isobutyrate | 11 |
| DOP (Di-2-ethylhexyl phthalate) | 28 |
| ESO (Epoxidized Soybean Oil) | 5 |
| Organotin Stabilizer | 2 |
| Titanium Dioxide (50% in DOP) | 3 |

The ink was applied with a No. 30 wire wound rod. After coating, the dry blend was fused in a Mathis hot-air oven at 425° F. for three minutes.

Table 1 shows the effect of increasing conductivity with increased loading of carbon black.

TABLE 1

Surface Resistivity as a Function of Carbon Level in the Dry Blend

| Carbon Level (Wt. %) | Surface Resistivity (Ohm/Sq) |
|---|---|
| Invention 4.8 | $5 \times 10^3$ |
| Invention 2.8 | $6 \times 10^4$ |
| Invention 1.2 | $5 \times 10^5$ |
| Invention 0.6 | $3 \times 10^9$ |
| Prior Art 20.0 | $1 \times 10^5$ |

It is indeed significant to note that with these very low amounts of carbon black it has been possible to obtain resistivity values which required almost twenty times the amount of carbon black with prior art techniques.

EXAMPLE 2

Compositions were prepared as in Example 1 except that the carbon black level was increased to 8% by weight. Surface resistivities below 102 ohm/sq. were obtained.

EXAMPLE 3

Dry blend was prepared containing 1.2% carbon black as in Example 1. A thin vinyl smear coat was applied to a piece of 8"×12" Warren release paper. The conductive "black" dry blend containing 1.2% carbon black was sprinkled over the surface of the smear coat. A thin layer of particles stuck to the smear coat and the excess particles were removed by inverting the release paper. The surface was smoothed with a thin roller and then the system was fused at 425° F. for three minutes. The result was a 0.00514 0.007" black film having a surface resistivity of $2 \times 10^4$ ohm/sq. suitable for conductive packaging.

EXAMPLE 4

A dry blend was prepared as in Example 1, except that the titanium dioxide was in a 1:1 dispersion with the DOP plasticizer; and that the carbon black and the DOP plasticizer were ordered as a custom made dispersion from the Penn Color Co. (Doylestown, Pa.). This dispersion was then blended with the other liquid ingredients and the titanium dioxide dispersion before it was combined with the PVC. The dry blend contained:

| Ingredient | Parts |
|---|---|
| PVC Resin | 100 |
| DOP | 35 |
| S-148 | 10 |
| ESO | 5 |
| PE-200 | 1 |
| M-275 | 2 |
| KR-55 | .16 |
| TiO$_2$ paste (1:1 w DOP) | 10 |
| Carbon Black | 2 |

After applying the overcoat of Example 1 of fusing the film, the overall appearance was a blue-gray and not black and gave a surface resistivity of $1 \times 10^6$ ohm/sq.

EXAMPLE 5

Conductive sheets were prepared as in Example 1 in which the "black" dry blend was diluted by mixing it with amounts up to 60% by wt. of a non-conductive "white" dry blend in which the carbon black level was reduced to 0.36% of the total sheet weight while providing a surface resistivity of $10^7$–$10^8$ ohm/sq. In comparison, sheets with 10 to 30% non-conductivity particles provided with a surface resistivity of $10^5$–$10^6$ ohm/sq. Table 2 shows comparative results. It can be seen that at 70% "dilution" surface resistivity increases dramatically.

TABLE 2

Surface Resistivity as a Function of the Amount of Added "White" Dry Blend

| Percent "Black" | Percent "White" | Surface Resistivity (Ohm/Sq) |
|---|---|---|
| 100 | 0 | 6-7 × $10^5$ |
| 90 | 10 | 7 × $10^5$ |
| 80 | 20 | 1 × $10^6$ |
| 70 | 30 | 2-3 × $10^6$ |
| 60 | 40 | 2 × $10^6$ |
| 50 | 50 | 2 × $10^7$ |
| 40 | 60 | 8 × $10^7$ |
| 30 | 70 | 1 × $10^{11}$ |

Tensile Properties of Conductive Sheet Goods

| Sample No. | DOP (Phr) | % "White" | % "Black" | Tensile Strength (psi) | Elongation (percent) |
|---|---|---|---|---|---|
| 1 | 30 | 0 (Control) | 0 | 2147 | 289 |
| 2 | 30 | 100 | 0 | 2113 | 284 |
| 3 | 35 | 100 | 0 | 2018 | 318 |
| 4 | 40 | 100 | 0 | 1875 | 302 |
| 5 | 30 | 90 | 10 | 2156 | 286 |
| 6 | 30 | 80 | 20 | 2206 | 278 |
| 7 | 30 | 70 | 30 | 2154 | 288 |

Not only did the wide range of test samples provide exceptional physical and static dissipative properties, but a wide range of attractive grey and salt and pepper effects were observed with the minimal amounts of carbon utilized.

EXAMPLE 6

Conductive foam compositions were prepared in "black" and "grey" modifications according to the following:

| Ingredients | Black Foam | White Foam |
|---|---|---|
| PVC Resin | 100 | 100 |
| DOP | 30 | 17 |
| DOA (dioctyl adipate) | — | 10 |
| S-148 | 10 | 10 |
| ESO | 5 | 5 |
| PE-200 | 1 | 1 |
| Diazo blowing agent | 4.4 | 4.4 |
| Ba Neodecanote | 1.25 | 1.25 |
| Ca, Zn Soap stabilizer | 2.75 | 2.75 |
| Markstate AL-15 | — | 6 |
| TiO₂ Paste (1:1 w DOP) | — | 6 |
| Conductex ® 975 | 2 | — |

To make the grey foam, 70 parts of the black foam was mixed with 30 parts of the white foam, putting the blowing agent in the white blend helped create the grey look in the overall composition. The final composition had a surface resistivity of $2.3 \times 10^6$ ohm/sq.

EXAMPLE 7

A white composition was prepared similar to Example 1 except using white conductive particles of titanium dioxide coated with antimony doped tin oxide available from Mitsubishi Metal Corporation and identified as W-1. The formulation was:

| | |
|---|---|
| PVC Resin | 100 |
| DOP | 40 |
| S-148 | 10 |
| ESO | 5 |
| PE-200 | 1 |
| M-275 | 2 |
| KR-55 | .16 |
| W-1 | 20 |

The composition was prepared and tested as in Example 1. After sintering, the composition gave a surface resistivity of $10^8$, while after fusion the value was $3.0 \times 10^9$ ohm/sq.

What is claimed is:

1. A vinyl surface covering material having reduced electrical surface resistivity, comprising a fused sheet of an overcoated dry blend, wherein the dry blend includes:
   (a) a polyvinyl chloride porous dry blend resin, the said porous dry blend resin comprising particles of resin with a conductive shell,
   (b) a plasticizer for the polyvinyl chloride resin,
   (c) a stabilizer for the polyvinyl chloride resin, and
   (d) conductive particles in an amount of from 0.2 to 20% by weight of the total weight of the material, wherein the conductive particles form the conductive shell, and further, wherein the overcoated dry blend has a vinyl plastisol overcoat.

2. The surface covering material of claim 1 wherein the overcoat is a white printing ink plastisol.

3. The surface covering material of claim 1 wherein the dry blend was sintered before it was overcoated.

4. The surface covering material of claim 1 wherein the conductive particles are carbon black.

5. The surface covering material of claim 4 wherein the carbon black is present in an amount of from about 0.2 to about 10% by wt.

6. A dispersion for preparing conductive polyvinyl chloride dry blend compositions having reduced surface resistivity comprising a liquid plasticizer for a polyvinyl chloride resin, and conductive carbon black particles dispersed in the liquid plasticizer, further providing that the dispersion has a Hegman gauge reading of from about 4 to about 6 and the conductive carbon black particles are present in an amount of from about 4 to about 8% by weight of the total weight of the dispersion.

7. The dispersion of claim 6 which also contains a liquid stabilizer.

8. A conductive, polyvinyl chloride resin for preparing layered compositions and surface covering sheet materials having reduced surface resistivity which comprises particles of a porous polyvinyl chloride dry blend resin, a polyvinyl chloride plasticizer, a polyvinyl chloride stabilizer, and conductive particles wherein, the conductive particles are located in crevices, in pores and on the surface of the particles of porous resin, and wherein the plasticizer and the stabilizer have been:

(a) absorbed into the resin particles, (b) adsorbed by the particles of porous resin, or (c) both absorbed into the resin particles, and absorbed by the particles of porous resin.

9. A resin as described in claim 8 wherein the resin particles together with the conductive particles, the plasticizer, and the stabilizer, have been sintered to form a conductive, sintered, polyvinyl chloride resin.

10. A method for preparing a conductive, particulate polyvinyl chloride resin comprising mixing particles of a porous polyvinyl chloride dry blend resin with a liquid pre-mix, the said liquid pre-mix including a liquid plasticizer for polyvinyl chloride and conductive particles, so that the mixing disperses the conductive particles into the dry blend resin to form a conductive matrix in the resin, and further so that the plasticizer is:

(a) absorbed into the resin particles, (b) adsorbed by the particles of porous resin, or (c) both absorbed into the resin particles, and absorbed by the particles of porous resin.

11. A method as described in claim 1 wherein the liquid pre-mix further includes a stabilizer for polyvinyl chloride.

12. A method as described in claim 1 wherein mixing is done in the presence of heat to cause absorption of the liquid pre-mix by the particles of resin further providing that the temperature during mixing is less than 160° F.

13. A method as described in claim 10 wherein the conductive particles are carbon black.

14. A method as described in claim 10 wherein the liquid pre-mix is a dispersion having a Hegman gauge reading in the range of from about 4 to about 6.

15. A method for producing a vinyl sheet material having reduced electrical surface resistivity, comprising:

(a) spreading resin particles out onto a surface to form a layer, the said resin particles comprising particles of a conductive, polyvinyl chloride dry blend resin having a conductive matrix in the form of conductive shells on the particles and (b) fusing the resin particles to form a sheet material having reduced electrical surface resistivity.

16. A method as described in claim 15 wherein, before step (b) the resin particles are sintered.

17. A method as described in claim 15 where, in step (a) the resin particles are spread out onto the surface of a smear coat.

18. A method as described in claim 15 which uses sintered particles of the conductive, polyvinyl chloride dry blend resin.

19. The surface covering material of claim 1 which is a floor covering.

20. The surface covering material of claim 1 wherein the vinyl plastisol overcoat includes an

* * * * *

UNITED STATES PATENT AND TRADEMARK OFFICE
CERTIFICATE OF CORRECTION

PATENT NO. : 5,066,422

DATED : November 19, 1991

INVENTOR(S) : Richard E. Felter et al

It is certified that error appears in the above-identified patent and that said Letters Patent is hereby corrected as shown below:

In column 2, line 47, "(t')" should read --(b)--; in column 10, line 31, "102" should read --$10^2$--; in column 10, line 44, "0.00514" should read --0.005--; in column 11, line 1, the word "of" (2nd occur) should read --and--; in column 11, line 13, the word "with" should be deleted; in column 13, line 1 of claims 11 and 12, "1" should read --10--; and in column 14, line 2 of claim 20, after the word "an" insert --ingredient selected from the group consisting of a stabilizer, a pigment, a processing aid, a foaming agent, a modifier, and a hardener.--.

Signed and Sealed this

Second Day of March, 1993

Attest:

STEPHEN G. KUNIN

Attesting Officer

Acting Commissioner of Patents and Trademarks